US008924256B2

(12) United States Patent
Herf

(10) Patent No.: US 8,924,256 B2
(45) Date of Patent: Dec. 30, 2014

(54) SYSTEM AND METHOD FOR OBTAINING CONTENT BASED ON DATA FROM AN ELECTRONIC DEVICE

(75) Inventor: Michael Bryan Herf, Studio City, CA (US)

(73) Assignee: Google Inc., Mountain View, CA (US)

( * ) Notice: Subject to any disclaimer, the term of this patent is extended or adjusted under 35 U.S.C. 154(b) by 1455 days.

(21) Appl. No.: 11/096,617

(22) Filed: Mar. 31, 2005

(65) Prior Publication Data

US 2006/0224448 A1 Oct. 5, 2006

(51) Int. Cl.
*G06Q 30/00* (2012.01)
*G06F 17/30* (2006.01)
*G06Q 30/02* (2012.01)
*H04N 7/10* (2006.01)
*H04N 7/025* (2006.01)

(52) U.S. Cl.
CPC ........ *G06F 17/3089* (2013.01); *G06Q 30/0264* (2013.01)
USPC ......................................... 705/14.67; 725/34

(58) Field of Classification Search
CPC .. G06Q 30/02; G06Q 30/0241; H04N 21/812
USPC ....................................................... 705/1–28
See application file for complete search history.

(56) References Cited

U.S. PATENT DOCUMENTS

| 5,948,061 | A * | 9/1999 | Merriman et al. ............ 709/219 |
| 6,662,215 | B1 * | 12/2003 | Moskowitz et al. .......... 709/217 |
| 6,665,659 | B1 | 12/2003 | Logan |
| 6,691,107 | B1 | 2/2004 | Dockter et al. |
| 6,833,865 | B1 | 12/2004 | Fuller et al. |
| 2002/0041329 | A1 * | 4/2002 | Steinberg ...................... 348/207 |
| 2002/0087622 | A1 | 7/2002 | Anderson |
| 2003/0133017 | A1 | 7/2003 | Mauro |
| 2004/0059708 | A1 | 3/2004 | Dean et al. |
| 2004/0059712 | A1 | 3/2004 | Dean et al. |
| 2004/0203630 | A1 | 10/2004 | Wang |
| 2004/0249709 | A1 | 12/2004 | Donovan et al. |
| 2005/0018216 | A1 | 1/2005 | Barsness et al. |
| 2005/0038813 | A1 | 2/2005 | Apparao et al. |
| 2006/0179453 | A1 * | 8/2006 | Kadie et al. .................... 725/34 |

FOREIGN PATENT DOCUMENTS

| CN | 1439135 A | 8/2003 |
| CN | 1564520 A | 1/2005 |
| JP | 2001-350759 | 12/2001 |
| JP | 2003-044762 | 2/2003 |
| JP | 2003-264785 | 9/2003 |

(Continued)

OTHER PUBLICATIONS

"PhotoHighway.com Unfurls the PhotoTimes, Comprehensive Online Newsletter for PC Photo Fans", Business & Techonology Editors COMDEX Spring 99. Business Wire. New York: Apr. 20, 1999. p. 1.*

(Continued)

*Primary Examiner* — William A Brandenburg

(57) ABSTRACT

In one embodiment, data from an electronic device is identified. The data may describe an electronic device (e.g. a hardware or software device) on which a document was created or modified, the subject matter of a document, the state of a document, or the like. Content relating to the electronic device is obtained based on the data. The content may be obtained in response to viewing, editing, printing, emailing or other accessing and/or processing of the document.

24 Claims, 12 Drawing Sheets

(56) References Cited

FOREIGN PATENT DOCUMENTS

| JP | 2004-151856 A | 5/2004 |
|---|---|---|
| JP | 2004-253996 | 9/2004 |
| KR | 10-2002-0040958 A | 5/2002 |
| KR | 10-2004-0093136 | 11/2004 |
| WO | WO 00/19646 A | 4/2000 |
| WO | WO 2004/066202 | 8/2004 |

OTHER PUBLICATIONS

PCT International Search Report for PCT Appln No. US2006/012378, mailed Jul. 20, 2006 (2 pages).
PCT Written Opinion for PCT Appln No. US2006/012378, mailed Jul. 20, 2006 (5 pages).
AU Patent Application No. 2006230581, Examiner's Report No. 2, Oct. 20, 2011, 2 pages.
JP Patent Application No. 2008-504514, Notification of Reason for Rejection, Dispatched on Jul. 17, 2012, 2 pages.
KR Patent Application No. 2007-7025168, Notice of Grounds for Rejection, Issuance Date Jun. 12, 2012, 10 pages.
AU Patent Application No. 2006230581, Office Action, Jun. 20, 2011, 2 pages.
JP Patent Application No. 2008-504514, Office Action, Mar. 22, 2011, 3 pages (English Translation).
JP Patent Application No. 2008-504514, Office Action, Jul. 5, 2011, 6 pages (English Translation).
Summons to attend oral proceedings for European Application No. 06740436.8 mailed Aug. 26, 2013. 6 pages.
Examination Report, dated Mar. 5, 2014, for related Indian Patent Application No. 4326/CHENP/2007.
Examination Report, dated Feb. 27, 2014, for related Canadian Patent Application No. 2603430.
Third Notification of Office Action, dated May 20, 2013, for related Chinese Patent Application No. 200680011017.0.

\* cited by examiner

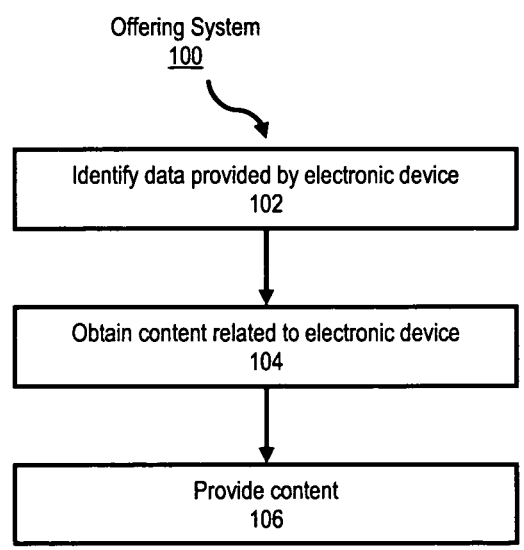

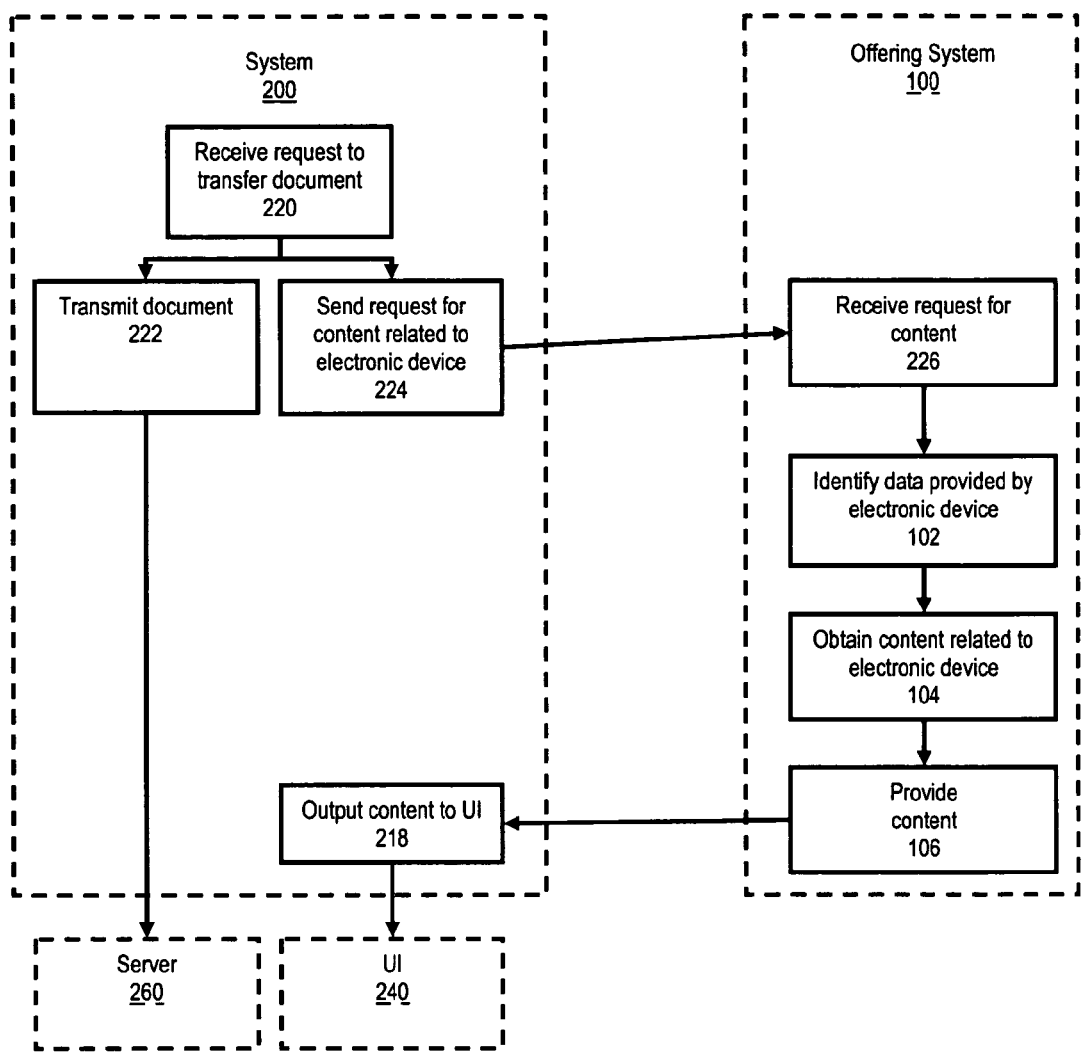

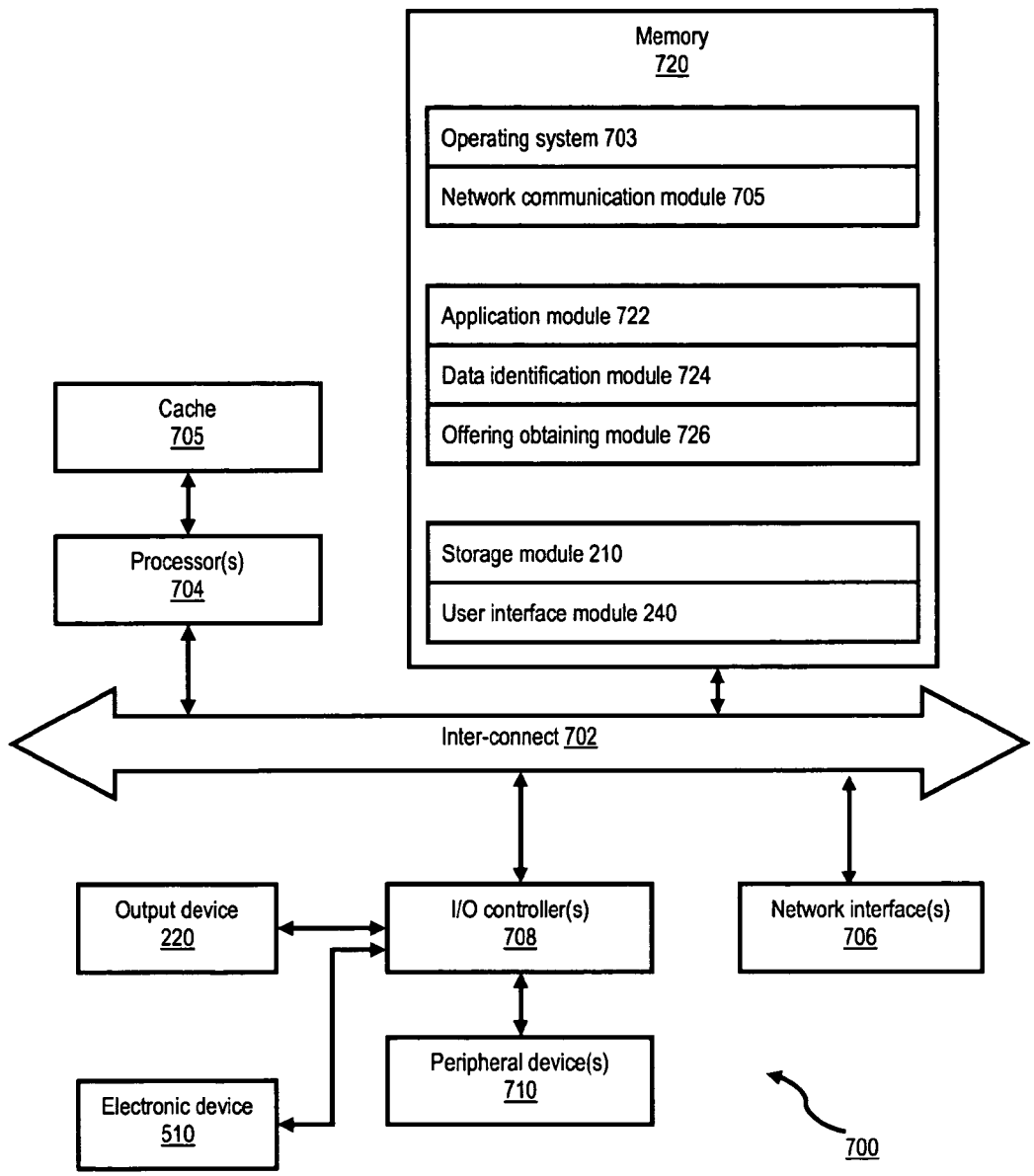

US 8,924,256 B2

SYSTEM AND METHOD FOR OBTAINING CONTENT BASED ON DATA FROM AN ELECTRONIC DEVICE

TECHNICAL FIELD

At least some embodiments of the present invention relate to obtaining content related to an electronic device, and more particularly to obtaining content based on data describing a document created or processed using the electronic device.

BACKGROUND

Consumers today are inundated with information and advertisements. Businesses attempt to compete for the consumers' attention. Targeted content (e.g. information or advertisements) may help businesses compete for attention. Targeted advertisements, for example, may allow a business to focus resources on customers who are more likely to purchase the businesses' product or service. Targeted content may also help consumers filter through large amounts of available data. For example, targeted web advertisements may allow consumers to spend less time navigating through unwanted ads.

Current systems for obtaining targeted content often rely on users actively submitting queries. These systems may not realize the full market of potentially interested consumers, however. For example, an online consumer who uses an electronic device may be interested in additional products or services related to that electronic device. However, the consumer may not undertake the initiative to actively search for an advertisement. What is desired is an improved system and method for obtaining content that may be of interest to a user.

BRIEF SUMMARY

In accordance with one embodiment of the invention, a method may identify data from an electronic device. The method may include obtaining content related to the electronic device based on the data.

In accordance with one embodiment of the invention, a machine-readable medium may have stored thereon a set of instructions, which when executed, perform a method. The method may include receiving data from an electronic device. The method may further include transmitting the data to obtain advertisement information based on the data. The method may also include providing the advertisement information.

In accordance with one embodiment of the invention, a system may include means for obtaining an image. The system may further include means for analyzing data associated with the image. The system may also include means for providing an advertisement based on the data.

BRIEF DESCRIPTION OF THE DRAWINGS

FIG. 1 illustrates a flow diagram of a system for offering content in accordance with one embodiment of the invention.

FIGS. 2A-2C illustrate flow diagrams of systems interacting with the system of FIG. 1 to obtain content in accordance with various embodiments of the invention.

FIG. 7 illustrates an environment for obtaining content related to an electronic device in accordance with another embodiment of the invention.

DETAILED DESCRIPTION

Figure 2A:
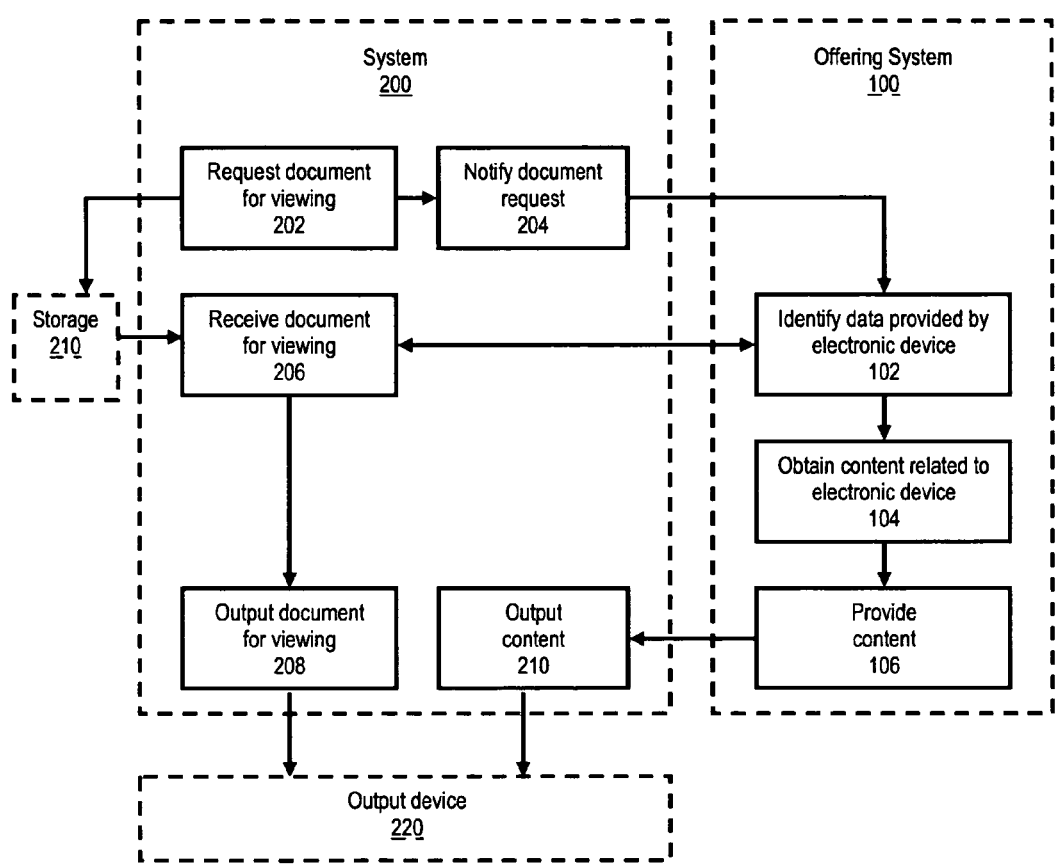

Described below is a method and system for obtaining content (e.g. information or targeted advertisement). The content may relate to an electronic device, including both software devices (e.g. a software application) and hardware devices (e.g. a digital camera or personal digital assistant). The content is based on data provided by the device. This data may be embedded in a document (e.g. in the document header or document body) or may relate to the document in another manner (e.g. a caption description, folder name or album name associated with the document).

For example, in certain embodiments, data from a camera is identified, such as metadata stored in a digital photograph header. The data may, for example, indicate a brand, model, type, feature (e.g. memory size), firmware version or the like. The data may then be provided to a tool (e.g. an online photo album) and content relating to that data may be obtained (e.g. an advertisement).

In other embodiments, data from a software editing tool, e.g. an image editor, is identified. For example, a user may take a photograph and edit the document on an image editor. The image editor may embed data in the document header indicating that the document was, for example, modified using the image editor, and/or modified using a certain version of the image editor, and/or modified by a particular user and/or modified on a particular date and time. This data may again be provided to a tool and content relating to the data may be obtained. For example, this data may indicate that the photograph was taken on CameraBrandA on Jan. 1, 2005, downloaded using SoftwareX on Jan. 2, 2005, edited using SoftwareY on Jan. 2, 2005 and uploaded to an online publisher on Jan. 2, 2005. Using some or all of this data, the online publisher customize the user's online experience. For example, the online publisher may provide links and/or advertisements to merchants offering products and/or services related to CameraBrandA, SoftwareX or SoftwareY. The online publisher may also provide links and/or advertisements to New Year related activities, e.g. links to other New Year photographs uploaded by the user's friends, links to websites reporting on New Year celebrations, or advertisements for merchants related to typical New Year resolutions. Software X or Y may also use the data to provide links and/or advertisements. For example, in certain embodiments, Software Y may analyze the image content (e.g. using image recognition algorithms), recognize the Seattle Space Needle in the image, and provide links and/or advertisements relating to Seattle generally or the Seattle New Year celebration, specifically.

In certain embodiments, the software application may embed other types of data in the document. For example, in addition to or instead of embedding data that indicates document modification, the application may embed data that associates the document with various filters selected and configured using the application. For example, a user may associate an image with a black and white filter to allow the user to view the image in black and white, while still preserving the image's original color data. The user may then transfer the image to, or otherwise associate the image with, an online photo album program, or any type of photo viewing, editing, organizing or other photo processing program. The online photo album program may identify the data that associates the image with the black and white filter and provide related content (e.g. an advertisement for black and white artwork).

In yet other embodiments, the data used to obtain the content may be from a software application which analyzes document's body. For example, an image recognition program may analyze the body of a digital photograph file and, based on the results of that analysis, content relating to the image subject matter may be provided. As a specific example, an image recognition program may be used in conjunction with an online photo album program. When a user selects the image for viewing, the image recognition program may analyze the image and determine that the image contains the White House. Using this data, the online photo album program may provide content related to the White House, e.g. trivia on the White House or an advertisement for political t-shirts. In certain embodiments, the image recognition program may analyze the image when the image is uploaded to the online server and store this data along with the image in the online server or database. In other embodiments, this analysis may occur when another event occurs, such as when the image is sent to an online photo processor for printing.

Therefore, a system obtaining content in accordance with embodiments of this invention may identify various data from an electronic device, including but not limited to data which indicates source, modification and/or processing. The system may also obtain content in response to various events, including but not limited to the processing, editing, viewing, sending, and/or printing, of a document containing the data or associated with the data.

In addition, the content obtained may have a variety of purposes and formats and may be presented in a variety of ways. For example, the content may be an advertisement for a particular camera model's accessories. In certain embodiments, the content may be outputted to a server and presented via a web publishing/hosting site, such as an online photo album site, for example. The content may alternatively, or additionally, be outputted to a client (e.g. a client software application or, more particularly, a user interface), and presented via a toolbar (e.g. a Google® toolbar), for example.

The following provides variations and examples of various aspects of embodiments of the invention. It will be appreciated that the following variations and examples are not intended to be exhaustive or to limit the invention to the precise forms disclosed. These variations and examples are to provide further understanding of embodiments of the present invention.

Process

FIG. 1 illustrates a flow diagram of a system for offering content in accordance with one embodiment of the invention. As used herein, reference to "offering" relates to offering content related to data identified from an electronic device, such as information or advertisements as described above. In FIG. 1, offering system 100 identifies data provided by an electronic device in block 102. As previously suggested, in certain embodiments, the electronic device may be hardware, such as a digital camera. In other embodiments, the electronic device may be software, such as image viewing or editing software (e.g. Picasa™). In certain embodiments, software may be used to transfer a document to another location. For example, software such as Hello™ may be used to transfer an image to another computer. The software may transfer the document without modification or, may edit the document before, during or after transfer, such as by reducing image resolution. Therefore, the electronic device may be hardware, software or a combination thereof, and may create, edit, modify, process or otherwise interact with the data to be provided and/or a document incorporating the data to be provided.

In certain embodiments, the data may be metadata describing the electronic device. For example, as previously suggested, the data may include a model, brand, feature or version. In embodiments where the device is a digital camera, the data may include, for example, a camera's focal range, digital zoom, optical zoom, storage capacity, recording method (e.g. integrated, secure digital card, compact flash, smart media or compact disc), type (e.g. SLR or rangefinder), or a range of megapixels. In embodiments in where the device is software, the data may include, for example, the software's version, add-on features, licensed features or enabled features. In other embodiments, the data may relate to accessories for the electronic device. For example, the data may relate to a camera's battery, flash or lens, or a software's related, compatible or add-on products.

In other embodiments, as previously suggested, the data may describe a document created by the electronic device rather than describe the device itself. For example, in certain embodiments, the document may be a digital image, audio file, video file or audio/video file. The data describing the document may include a time, date, month, year, season or time period relating to when the digital image, audio file, video file or audio/video file was created on the device.

In certain embodiments, this data is created at the same time as the file is created, e.g. a date/timestamp on a photo. In other embodiments, the data may be added to the file after the file is created. For example, the data may be the last date/time the file was modified or viewed. In other embodiments, the data may relate to transfer of the file from one device to another, e.g. a download date, email date or print date.

In yet other embodiments, the data may describe the contents of the file created by the electronic device. For example, the data may be a caption text describing the image. In other embodiments, the data may be a filename, an album name, a file system folder name or a network address. In other embodiments, the data may identify the file's subject matter obtained from an electronic analysis of the file, e.g. keywords generated using an image recognition program.

In FIG. 1, after the data is identified, content related to the electronic device (i.e. an offering) is obtained based on the data in block 104. In certain embodiments, the offering may include advertisements of products and/or services related to electronic device offered at various merchant websites. For example, in a previous example, the data was a camera model. In that example, the offering may include an advertisement for newer models in the same family. The offering may also include an advertisement for lenses available for that model. In embodiments wherein the data includes a description of an image, e.g. the locale of where an image was captured, the offering may include an advertisement for vacation packages in that locale. In yet other embodiments, the data may be the image megapixel, and the offering may include advertisements for photo processing centers specializing in high-quality prints if the megapixel is high or mass-quality prints if the megapixel is low. System 100 may obtain this offering in a variety of ways, as will be described further below.

In certain embodiments, the content may be provided in block 106. In certain embodiments, system 100 may passively provide the content by making the content accessible to a requesting system. In other embodiments, system 100 may actively provide the content by transmitting the content to another system, as will be described further below.

Figure 2B:
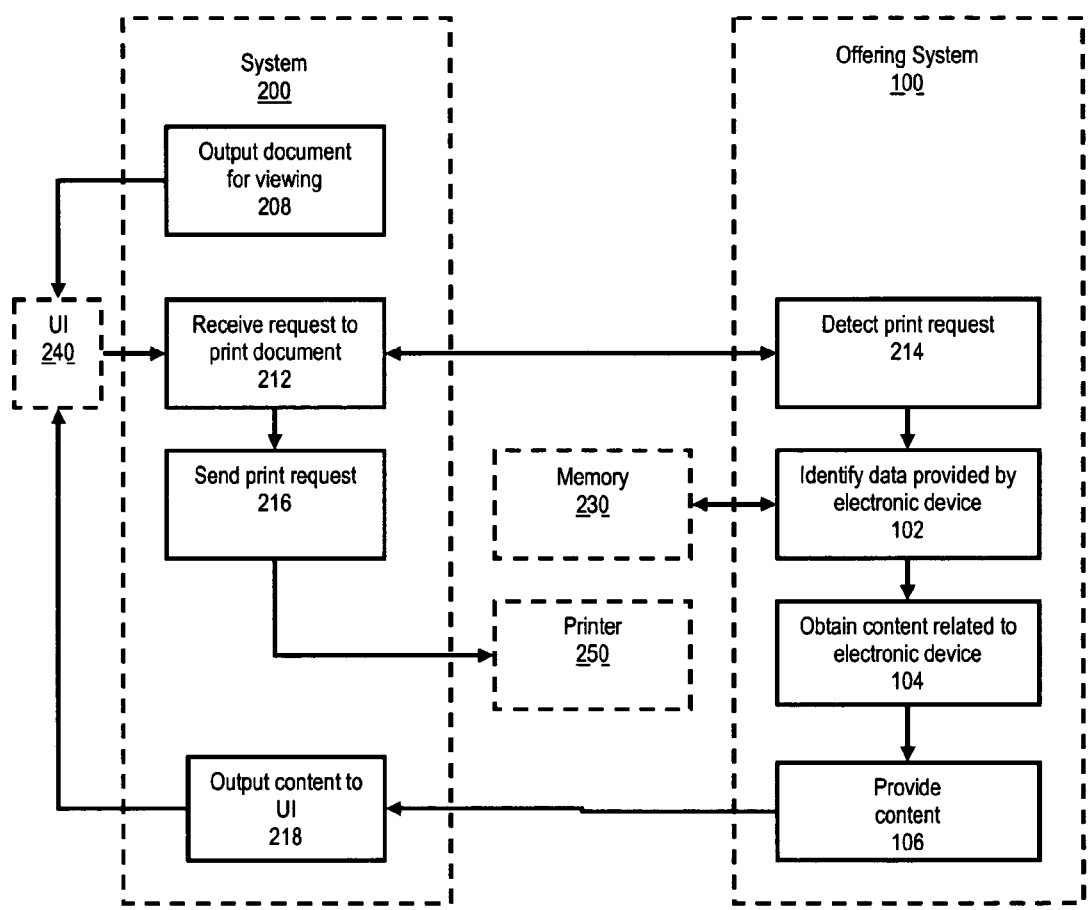

FIGS. 2A-2C illustrate flow diagrams of systems interacting with the system of FIG. 1 to obtain content in accordance with various embodiments of the invention. In FIG. 2A, system 200 initiates an interaction with offering system 100. Generally, system 200 may be software and/or hardware. For example, in certain embodiments, system 200 may be an email application, a document viewing application, a document editing application or a document organizing application. In FIG. 2A, system 200 is an application capable of outputting a document for viewing in output device 220.

In block 202, system 200 requests a document for viewing from storage 210. As previously discussed, the document may be created by an electronic device (or tool), e.g. a camera or editing tool. Storage 210 may be volatile or nonvolatile memory. In certain embodiments, storage 210 may be storage in the electronic device, e.g. a flash card, a subscriber identity module (SIM) card or allotted virtual memory. In other embodiments, storage 210 may be storage in a device other than the electronic device which created the document, such as a personal computer or a server. For example, the electronic device may have downloaded the document to a personal computer or server for storage in storage 210.

In block 204, while requesting the document from storage 210, system 200 also notifies offering system 100 of the document request. In embodiments in which system 200 and system 100 reside in the same machine, the notification may be via an internal or external bus. In other embodiments, the notification may be across a network. In certain embodiments, the notification may be targeted at offering system 100. In other embodiments, the notification may be broadcasted generally to all system listening on a certain channel.

In block 206, system 200 receives the document and then outputs the document in block 208 to output device 220. In certain embodiments, system 200 and output device 220 may be in separate machines, but connected to each other via a network, for example. In other embodiments, system 200 and output device 220 may be part of the same machine. For example, system 200 may be a software application and output device 220 may be a computer monitor, telephone display screen, television screen or a personal digital assistant (PDA) display screen. In other embodiments, output device 220 may be a visual display, e.g. cathode ray tube (CRT) monitor, a liquid crystal display (LCD) monitor, a plasma display or a projector display. In other embodiments, output device 220 may be a device that provides an audio output, e.g. a speaker. System 200 may output the document via a bus and a serial cable, a parallel cable, an audio/visual cable, or the like. System 200 may also output the document via wireless signals, e.g. radio frequency signals, or the like.

In block 210, system 200 also outputs content from offering system 100. To provide the content, offering system 100 first identifies data in response to a notification from system 200 (e.g. the notification sent in block 204). After the data is identified, system 100 obtains content related to the electronic device based on the data.

FIG. 2B illustrates a process in which a system (e.g. system 200) may initiate an interaction with offering system 100 in accordance with another embodiment of this invention. In FIG. 2B, a document is outputted in block 208 to user interface (UI) 240. The user interface may be software and/or hardware which provides an interface, directly or indirectly, with a user. For example, the user interface may be hardware which directly interfaces with a user, e.g. a monitor that displays a document to a user, similar to output device 220. In another embodiment, the user interface may be software which directly interfaces with a user, e.g. a graphical user interface. Alternatively, the user interface may be a combination of hardware and software which indirectly interfaces with a user, e.g. a communications interface card which uses software to couple to another device. The other device may provide a direct interface with the user.

In block 212, system 200 receives a request from the user interface for further processing of the document. In the embodiment shown in FIG. 2B, the request is a print request. In other embodiments, the request may include viewing the document in a different manner, editing the document or transmitting the document to another system. Transmitting the document to another system may include emailing, peer-to-peer transfers, and/or uploading or downloading of the document.

In block 214, offering system 100 detects the processing request. In certain embodiments, this detection may be accomplished by monitoring a state (e.g. a print status). Unlike the embodiment of FIG. 2A, system 100 in the embodiment of FIG. 2B does not wait for a request from system 200 to obtain content related to the electronic device (i.e. an offering). Rather, in the embodiment of FIG. 2B, system 100 monitors for activities that trigger a process to obtain an offering.

While system 200 processes the print request to printer 250 in block 216, offering system 100 accesses memory 230 to identify data provided by the electronic device. In the embodiment shown, memory 230 is separate from system 230. In other embodiments, memory 230 is part of system 200. Memory 230 may be volatile or nonvolatile memory. In certain embodiments, memory 230 may a cache or buffer used by system 200 to store a document while the document is being viewed, edited, printed, transmitted to another system, or otherwise accessed and/or processed. The identified data (e.g. metadata) may then be used to obtain content relating to the electronic device (e.g. an advertisement). After content is obtained using the data, the content may provided to system 200.

In block 218, system 200 outputs the content to the user interface. Various outputs are discussed in more detail below. In certain embodiments, the content is outputted while processing (e.g. printing) is in progress. In other embodiments, the content is outputted after the processing is completed.

FIG. 2C illustrates another process in which a system (e.g. system 200) may initiate an interaction with offering system 100 in accordance with one embodiment of the invention. In FIG. 2C, system 200 receives a request in block 220 to transfer a document created by an electronic device, e.g. for online storage. As previously discussed, the document may contain data, e.g. metadata, provided by the electronic device upon which an offering may be based. The request to transfer may be received through a network connection or an internal bus.

Similar to the embodiments of FIGS. 2A and 2B, the body of the document may be outputted to an output device or user interface (e.g. to preview, edit or print). In certain embodiments, the body of the document may not be outputted, however. Rather, a document identifier, e.g. a filename or title, may be listed in a directory, for example. The document may be selected for transfer by selecting the document identifier.

In block 222, system 200 transmits the document in response to the request. In this embodiment, the document is transmitted to server 260. Server 260 may be, for example, an email server, a document server (e.g. an image server), an application server or a database server. In other embodiments, system 200 may transmit the document to non-server system, e.g. a client, a separate machine via a peer to peer connection, or an application.

In block 224, while the request to transmit is being processed, system 200 also sends a request to obtain content related to an electronic device (i.e. an offering). In certain embodiments, the request may include the body of the document having data relevant to obtaining the content. In other embodiments, the request may not include the body of the document but still include the data relevant to obtaining an offer. For example, the request may include an image header having relevant metadata, but may not include the body of the image file, e.g. the image data. In FIG. 2C, after the data is identified and the offering obtained, the offering is provided in block 106 and outputted to user interface 240 in block 218.

Figure 3A:
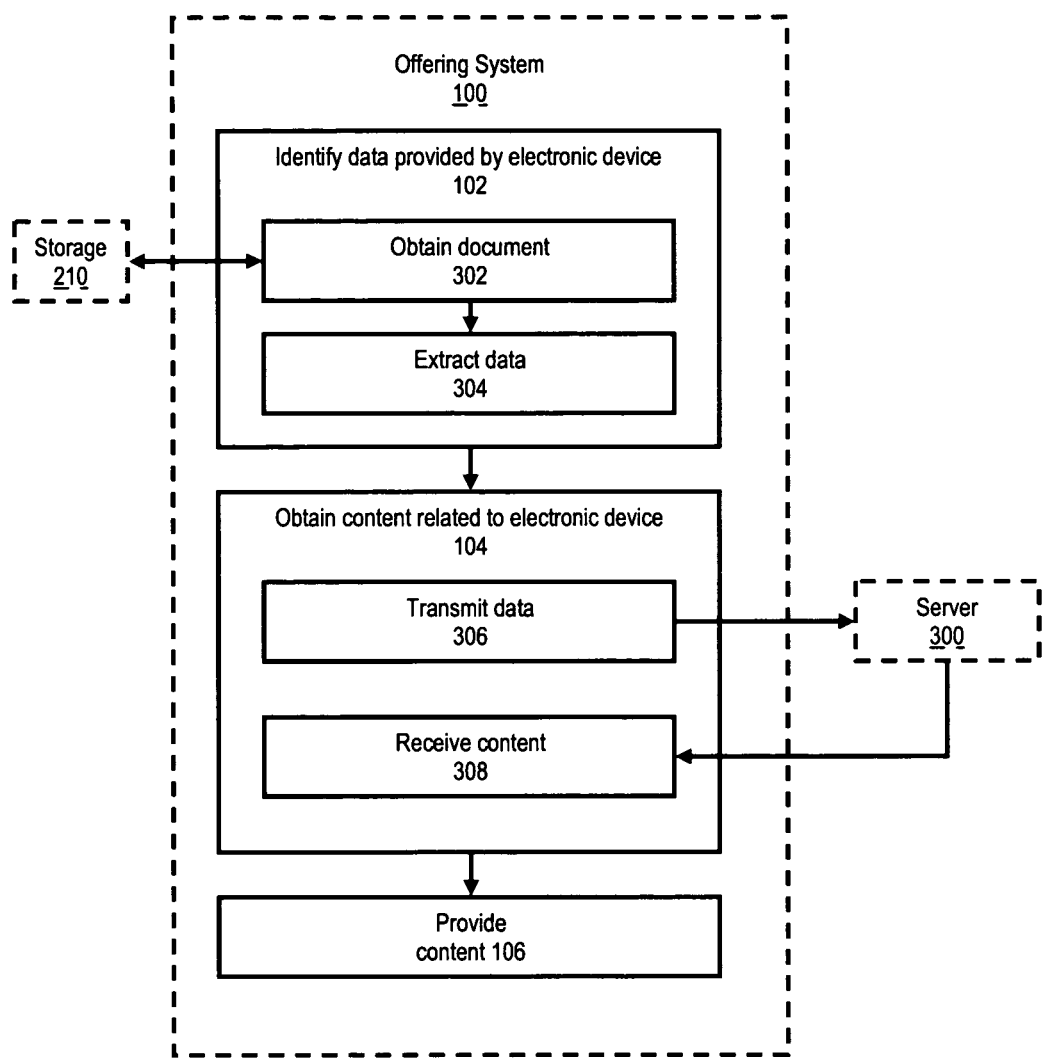
FIGS. 3A-3B illustrate flow diagrams of the system of FIG. 1 interacting with another system to obtain content in accordance with various embodiments of the invention.
Figure 3B:
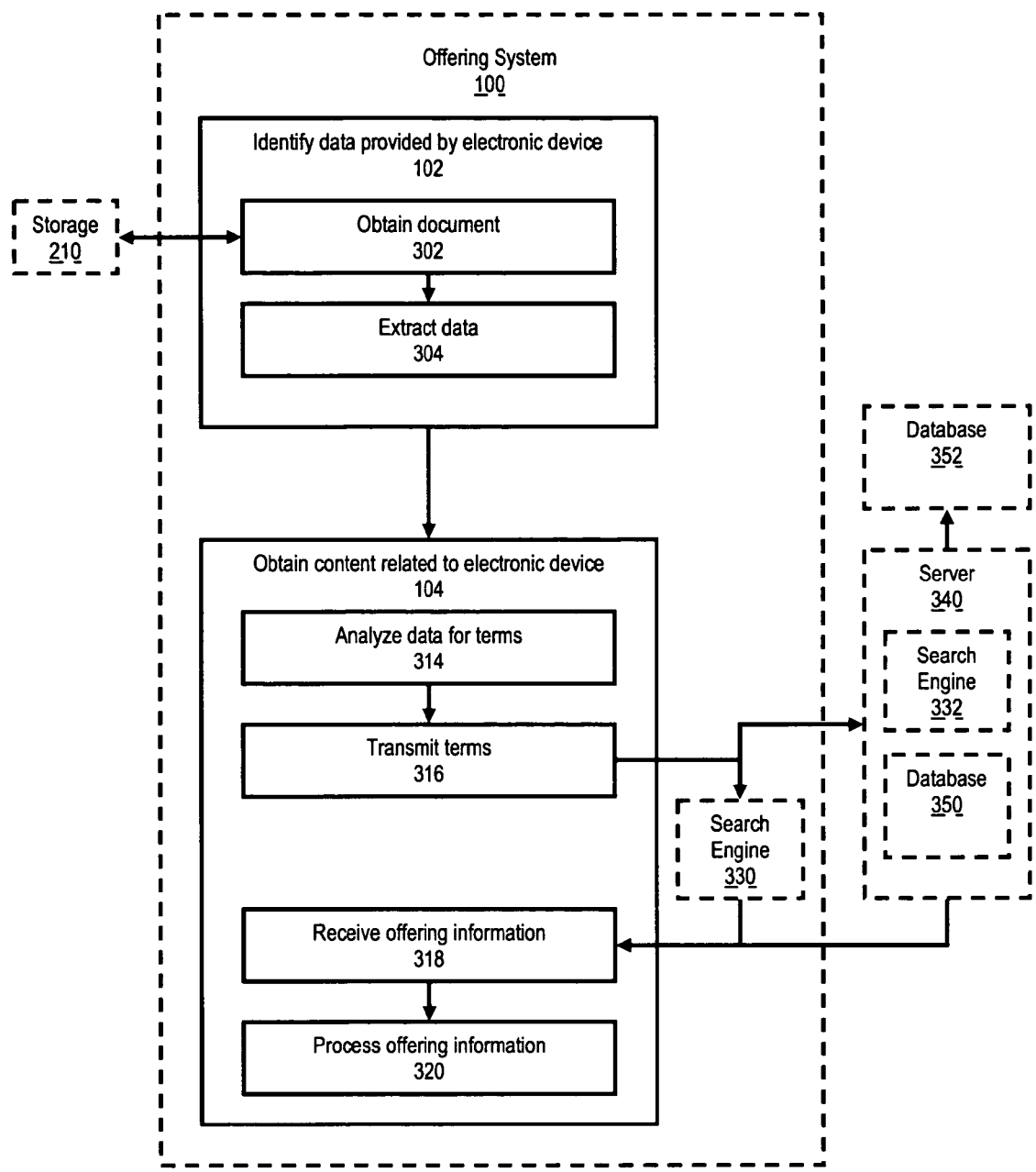

FIGS. 3A-3B illustrate flow diagrams of the system of FIG. 1 interacting with another system to obtain content in accordance with various embodiments of the invention. Specifically, FIGS. 3A-3B illustrate interactions between offering system 100 and one or more systems from which the offering system may obtain content, e.g. an advertisement.

In FIG. 3A, offering system 100 identifies data provided by an electronic device by first obtaining a document in block 302. In this embodiment, the document is obtained from storage 210. In other embodiments, the document may be obtained from memory in offering system 100, or from memory in a different system (e.g. memory 230). In yet other embodiments, the document may be provided along with a request to obtain content, as previously discussed in relation to FIG. 2C.

In block 304, data is extracted from the document. In certain embodiments, the data may be extracted by analyzing data in the document body (e.g. an abstract, summary or a table of contents). In other embodiments, the data may be extracted by analyzing a property of the document (e.g. the filename, an album name, a file system folder name or a network address). The data may also be extracted by extracting and parsing a header for relevant metadata (e.g. the information relating to the device on which the document was created).

In block 306, the data is transmitted to another system. In the embodiment of FIG. 3A, the data is transmitted to server 300. In certain embodiments, server 300 may search for content based directly on the data. For example, server 300 may query a database or employ a search engine to search for advertisements having a particular search term (e.g. a camera model).

In other embodiments, server 300 may search for content based indirectly on the data. For example, as previously suggested, the server may search for advertisements by photo processing centers specializing in high-quality prints if an image megapixel is high or mass-quality prints if an image megapixel is low. In this example, the megapixel data provided by a camera is not directly used in a content search but rather indirectly used via an algorithm which is applied to the data to provide one or more search parameters. The server may use a variety of algorithms, including heuristic algorithms, to determine content based on the data (i.e. an offering).

Alternatively, rather than a server applying the algorithm to the data, in certain embodiments, offering system 100 applies the algorithm. For example, in FIG. 3B, offering system 100 analyzes data for terms in block 316.

In block 316, the terms are transmitted. In certain embodiments, the terms may be transmitted to search engine 330 which is included in offering system 100. In other embodiments, the terms may be transmitted to external system, e.g. server 340, which may include search engine 332 and/or database 350. In FIG. 3B, server 340 is also coupled to an external database 352, which may also store content.

In certain embodiments, search engine 330 or 332 may search a database of businesses who have subscribed to a particular offering service. For example, a subscribing business may submit ads in the form of applets or banners to a database. Search engine 330 or 332 may search the database of applets and banners for an appropriate offering. Search engine 330 or 332 may then transmit a selected applet or banner or similar object to offering system 100, to be received in block 318. Alternatively, the search engine may transmit a location of the selected advertisement, e.g. a uniform resource locator (URL).

In other embodiments, a subscribing business may submit contact information to a database. Search engine 330 or 332 may search the database of contact information. A selected contact information may then be formatted by another system, application or service to place the contact information in an acceptable format (e.g. an applet or script object) before transmitting the acceptably formatted contact information to system 100 as an offering. Alternatively, the selected contact information may be transmitted to offering system 100 unformatted. Offering system 100 may receive the unformatted contact information in block 318 and then format and otherwise process the information in block 320.

In yet other embodiments, search engine 330 or 332 may search a public database for information to provide as an offering. For example, in one embodiment, the electronic device may be a medical monitoring device. Data from the medical monitoring device may be uploaded to an application designed to help patients track glucose or cholesterol levels, for example. The search engine may search a database of public medical and/or nutrition advice. This advice may be provided as an offering of information relating to a medical condition having those symptoms.

Therefore, in block 318, offering information received by offering system 100 includes, but is not limited to, actual advertisement (e.g. the applet, banner ad or script object), a location of the advertisement (e.g. a URL or file system address), and unformatted content. The offering information may also include a list of advertisements or a list of where the advertisements may be located.

In block 320, as previously suggested, the offering information may be processed. In the embodiment previously discussed, offering system 100 may process the offering information by formatting the content into an embeddable object. In another embodiment, search engine 330 may return a list of advertisement locations. Offering system 100 may then process this offering information by selecting an advertisement from the list and retrieving the advertisement. In other embodiments, offering system 100 may process the information in other ways, e.g. by generating a web page with the embedded advertisement.

EXAMPLES

Content related to data identified from an electronic device (i.e. an offering) may be provided at various levels of a communications system. For example, an offering may be provided by a server, such as from a web publishing site (e.g. an online photo album site). The offering may also be provided by a client, e.g. an email application (e.g. Gmail™), a document viewing application (e.g. Picasa™, Hello™ or a web browser), a document editing application (e.g. Picasa™), a document organizing application (e.g. Picasa™) or an instant messaging application (e.g. Hello™). Additionally, an offering may be provided from a front-end object, e.g. a toolbar, button, menu, banner, dialogue box or pop-up window.

Figure 4A:
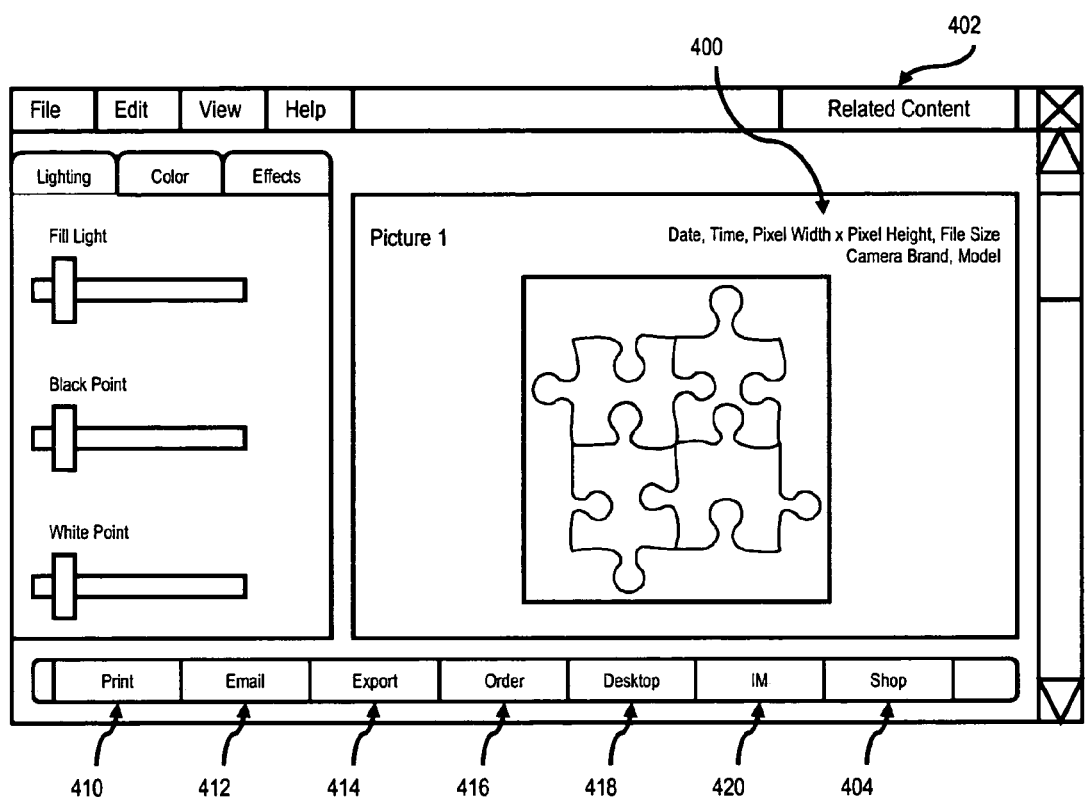
FIGS. 4A-4C illustrate screen shots of content provided in accordance with various embodiments of the invention.
Figure 4B:
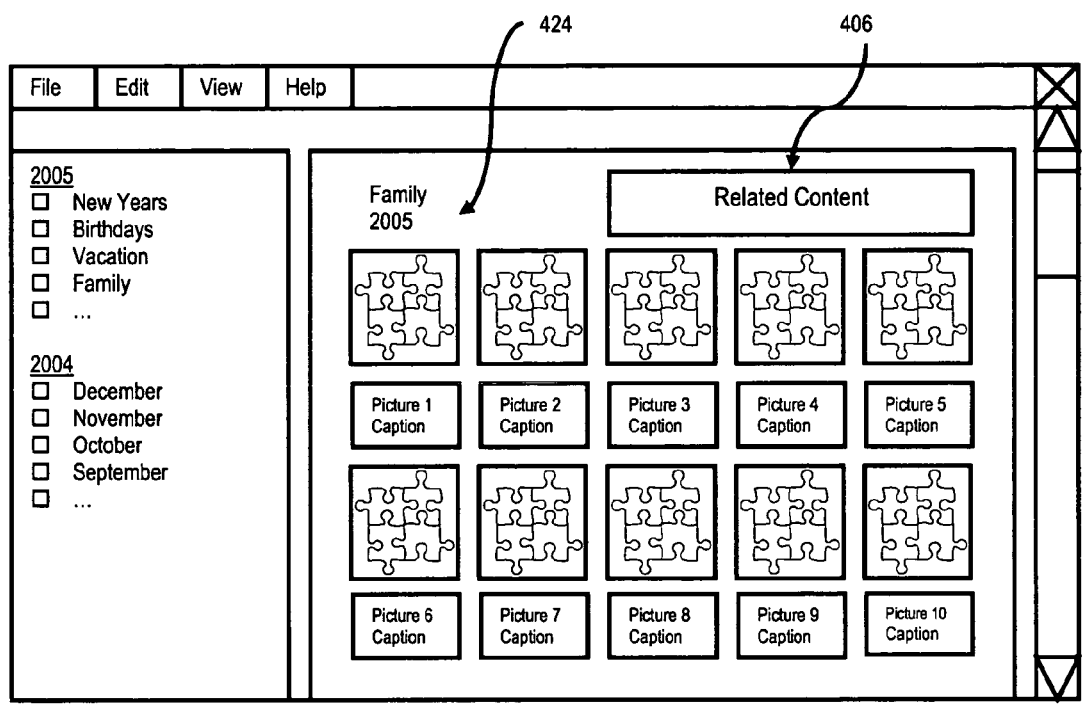
Figure 4C:
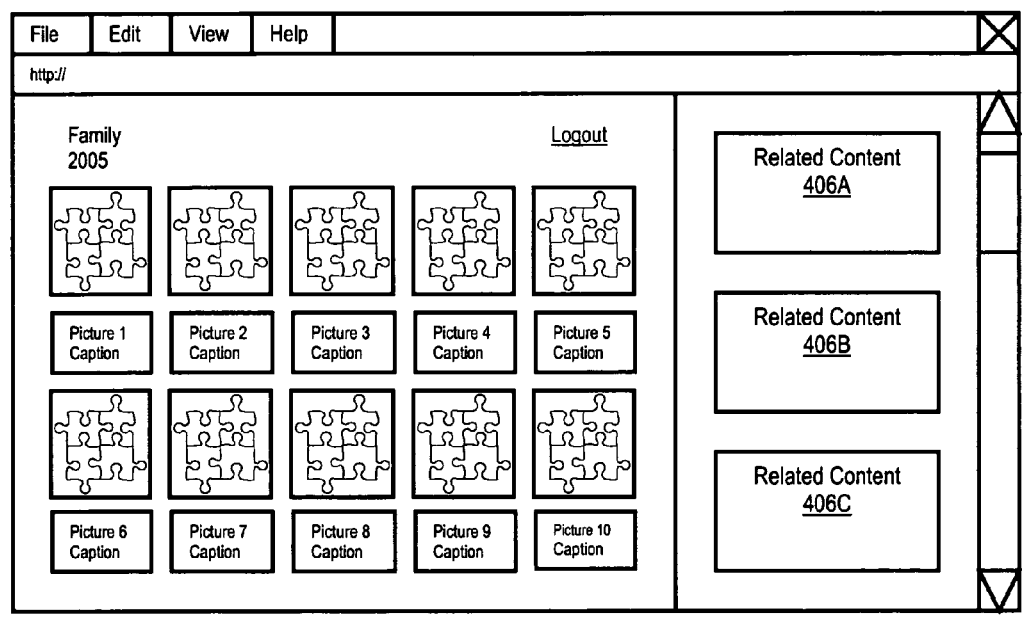

FIGS. 4A-4C illustrate screen shots of content provided in accordance with various embodiments of the invention. In FIG. 4A, an image editing and/or organizing application is shown. This editing or organizing application may be installed on a client machine or may be provided via a web publishing site (e.g. as a web application). Related content 402 (i.e. content related to data identified from an electronic device) is based on data 400, provided by an electronic device (not shown). Related content 402 is provided on a frame or toolbar of the application's graphical user interface. In certain embodiments, related content 402 may alter when a picture replaces the currently displayed picture. In other embodiments, related content 402 may alter when a currently displayed picture is edited, printed or otherwise processed.

For example, if a user selects tool 410 to print the image, related content 402 may change. If the user then selects tool 412 to email the image, related content 402 may change again. Related content 402 may change whenever an image is exported, ordered, sent to a desktop (e.g. as a background image), sent over an instant messenger (IM), or otherwise processed using tools such as buttons 410-420.

Additionally, in FIG. 4A, the user interface has shopping tool 404. In certain embodiments, selection of tool 404 may open a browser window to list several related contents (i.e. one or more offerings related to data 400). In other embodiments, selection of tool 404 may reveal a menu of topics related to data 400. For example, selection of tool 404 may reveal a drop-down menu with menu items such as "camera accessories," "vacation packages," "camera upgrades," and the like. Selection of a menu item may open, for example, a browser window listing several related contents (i.e. one or more offerings related to the menu item). Thus, the offering may be provided via a variety of interfaces and tools including, but not limited to, toolbars, banners, buttons, menus, dialogue boxes and pop-up windows.

FIG. 4B shows another screenshot of content provided in accordance with one embodiment of this invention. In FIG. 4B, an image organizing application is shown. Again, this application may be installed on a client machine or provided via a web publishing site (e.g. as a web application). Images are organized into categories and albums, e.g. by year, topics and/or month. Specifically, Pictures 1-10 are organized into a category/album entitled "Family," which is part of another category/album entitled 2005. In certain embodiments, the category/album document structure may not reflect the file system structure. Related content 406 is based on data 424 (e.g. Family 2005), which is descriptive of both document subject matter (e.g. family) and a document property (e.g. 2005). In this embodiment, the description of the document subject matter was created after the document was created while the description of the document property was created as the document was created.

Related content 406 (consistent with this data) may relate to the document subject matter but not the document property. For example, the related content may relate to families, e.g. an advertisement to track genealogical heritage. In another embodiment, the related content may relate to both the document subject matter and the document property. For example, the related content may relate to gifts for Father's Day or Mother's Day.

FIG. 4C shows yet another screenshot of content provided in accordance with one embodiment of this invention. In FIG. 4C, an online photo album web service is shown. The images may be displayed in any variety of ways, and are not limited to the arrangement shown in FIG. 4C. In FIG. 4C, several related content 406A-C are shown. Each may relate to the data such as 400 or 406 as described above. Each related content 406A-C may be related to the same data (e.g. camera brand), for example, but show a different advertiser. In another embodiment, each related content 406A-C may relate to different data. For example, related content 406A may relate to a camera brand, related content 406B may relate to an album name, and related content 406C may relate to a software application used to process a selected image.

System

Figure 5:
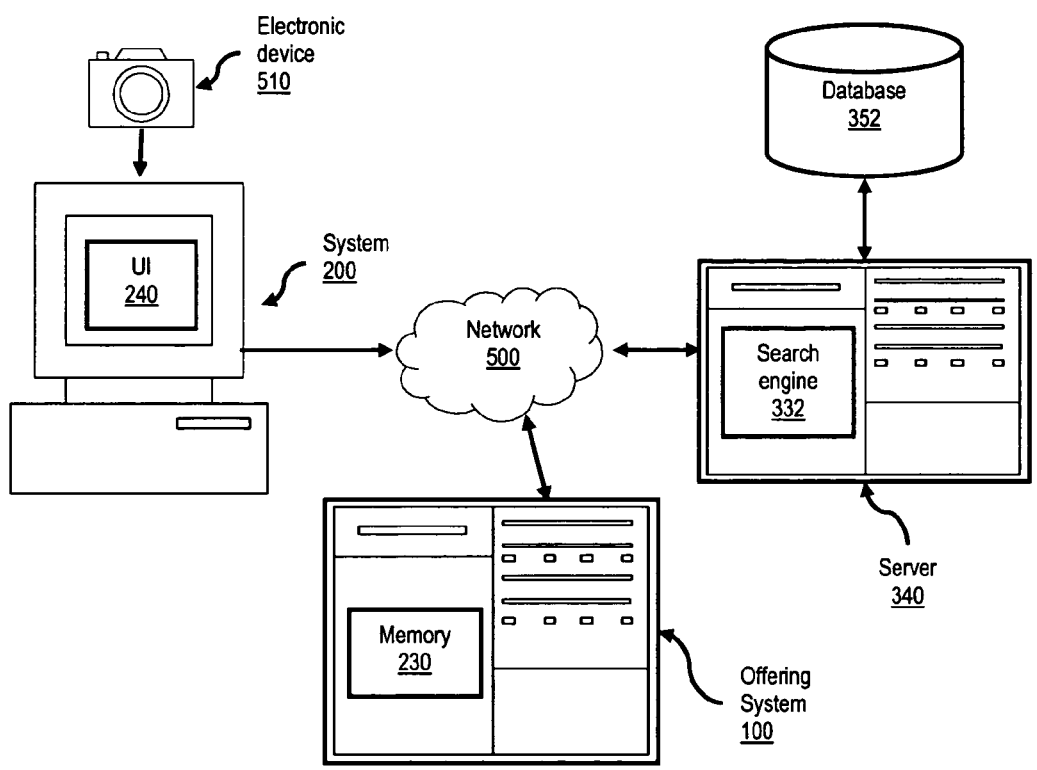
FIG. 5 illustrates an environment for obtaining content related to an electronic device in accordance with one embodiment of the invention.

FIG. 5 illustrates an environment for obtaining content related to an electronic device in accordance with one embodiment of the invention. In FIG. 5, the electronic device 510 is depicted as a still camera. However, electronic device 510 may be any electronic device capable of providing data on which content may be based, including digital capture devices, peripherals and software tools. For example, electronic device 510 may be a digital still camera, digital video camera, mobile phone camera, scanner, a video capture card or a digital audio capture device. In other embodiments, the electronic device may be a personal digital assistant, mobile telephone, a wireless hand-held devices or a personal health monitor.

In FIG. 5, system 200, which initiates an interaction with offering system 100, is shown as a computer. In this embodiment, system 200 also includes user interface 240. System 200 initiates the interaction with offering system 100 through network 500. Network 500 may be a wide area network (WAN), such as the Internet. In other embodiments, network 500 may also be a metropolitan area network (MAN), such as those used on college campuses, a local area network (LAN), such as those used within an office building or household, or a personal area network (PAN), such as those used between wireless computer peripherals.

Network 500 may use a number of communications protocols, including various combinations of protocols at different open systems interconnection (OSI) model levels. For example, network 500 may use integrated services digital network (ISDN), point-to-point protocol (PPP), X.25, internet protocol (IP), transmission control protocol (TCP), user datagram protocol (UDP), file transfer protocol (FTP), and hypertext transfer protocol (HTTP). In addition, the signals transmitted through network 500 may travel through landlines, airwaves, or a combination thereof. In certain embodiments, network 500 may conform to wireless communications standards such as Bluetooth and the Institute of Electrical and Electronics Engineers (IEEE) 802 standards, e.g. IEEE std. 802.11g-2003, published Jun. 27, 2003. In addition, network 500 may include devices such as satellites, gateways and routers. For example, network 500 may be a telecommunications network which includes devices to transmit and receive signals from a mobile telephone client through an access tower, to a satellite, down to a base station, through a land-base telephone line and to a computer. In such an embodiment, the mobile telephone client may display the advertisement obtained by offering system 100.

As another example, network 500 may be a computing network which includes devices to transmit and receive signals from a console, through a wireless adapter, to a router, through a broadband modem, to an ISP network of computers, through the Internet backbone and back through another set of devices to a data storage device. In such an embodiment, the console may display the advertisement obtained by offering system 100.

Offering system 100 is shown as a server system separate from system 200. In this embodiment, offering system 100 includes memory 230. Memory 230 may store data and/or documents transmitted from system 200 to system 100 as part of a request to obtain an offering. In this embodiment, offering system 100 transmits the data and/or offering search terms to server 340 which includes search engine 332 and is coupled to database 352, as previously described. Additionally, in this embodiment, offering system 100 transmits the data and/or offering search terms over the same network used to communicate with system 200, e.g. the Internet. In other embodiments, offering system 100 may use one or more other networks instead of, or in addition, to network 500 to communicate with server 340.

Figure 6:
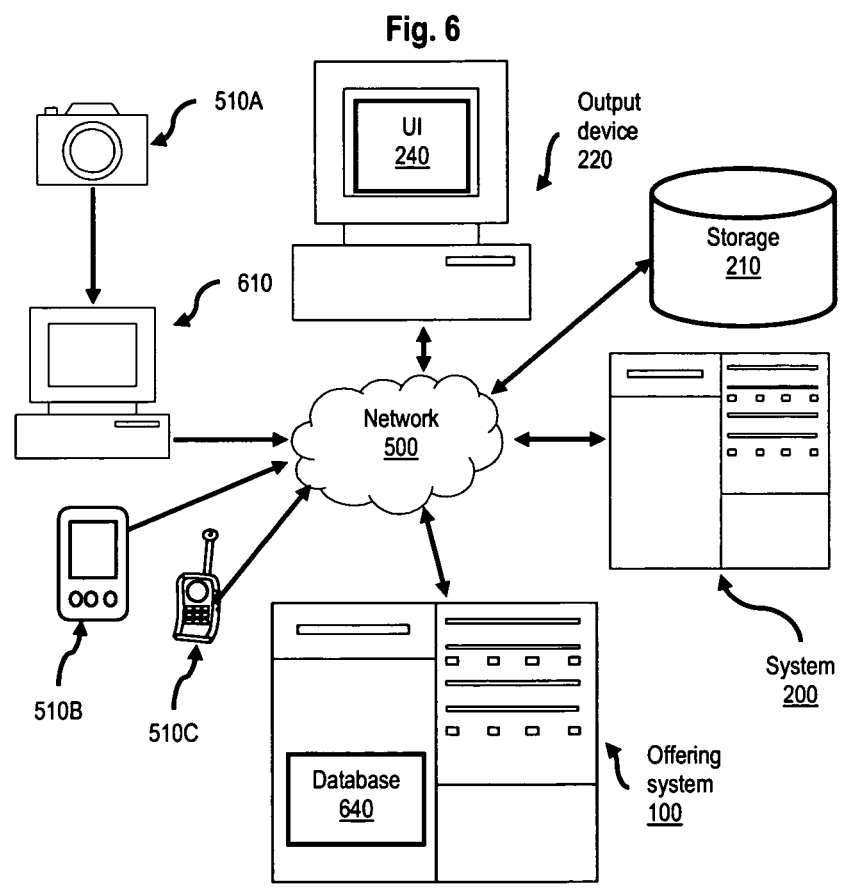
FIG. 6 illustrates an environment for obtaining content related to an electronic device in accordance with another embodiment of the invention.

FIG. 6 illustrates an environment for obtaining content related to an electronic device in accordance with another embodiment of the invention. In FIG. 6, electronic device 510A uploads data to system 610. This data is stored in storage 210. For example, in one embodiment, electronic device 510A is a camera which uploads images onto a personal computer. The personal computer transfers the image via network 500 to an online album that stores images in storage 210. Electronic devices 510B (shown as a personal digital assistant) and 510C (shown as a mobile phone) may also provide data on which content may be based.

In one embodiment consistent with FIG. 6, user interface 240 may transmit a request to system 200 to view, print, email, or otherwise access and/or process a document stored in storage 210. For example, UI 240 may transmit a request to view an image stored in an online album. System 200 retrieves the document from storage for outputting to output device 220, which is coupled to UI 240. In one embodiment, system 200 also sends a request to system 100 to obtain content related to the data (i.e. an offering) in the request for the document. In other embodiments, offering system 100 may detect a document request from user interface 240, a document retrieval from storage 210, or a document transmittal from system 200. Offering system 100 may then obtain content from database 640, which is included in offering system 100. The content may then be provided to system 200. In other embodiments, the content may be provided directly to output device 220 or user interface 240, bypassing system 200.

In other embodiments consistent with FIG. 6, electronic devices 510B and/or 510C may send data on which content is based. Electronic devices 510B and/or 510C may also send a request for content to system 200. Therefore, an electronic device that provides data (e.g. metadata) on which content is based may also request the offering.

FIG. 7 illustrates an environment for obtaining content related to an electronic device in accordance with another embodiment of the invention. While FIG. 7 illustrates various components of a computer system, it is not intended to represent any particular architecture or manner of interconnecting the components as such details are not germane to the present invention. Other systems that have fewer or more components may also be used with the present invention. Furthermore, some components described above with reference to FIGS. 5 and 6 may also be employed in FIG. 7.

In FIG. 7, the embodiment includes an inter-connect 702 (e.g., bus and system core logic) to interconnect memory 720 and one or more processor(s) 704, which are coupled to cache memory 705. Processor(s) 704 may execute instructions stored in memory 720. The inter-connect 702 further interconnects processor(s) 704 and memory 720 to one or more devices 220, 510 and 710 via one or more input/output (I/O) controller(s) 708. The inter-connect 702 may include one or more buses coupled with one another through various bridges, controllers, and/or adapters. In one embodiment the I/O controller 708 may include a USB adapter for controlling USB peripherals, an IEEE-1394 bus adapter for controlling IEEE-1394 peripherals, and the like.

Memory 720 may include Read Only Memory (ROM), volatile Random Access Memory (RAM), and non-volatile memory, such as hard drive, flash memory, etc. Volatile RAM is typically implemented as dynamic RAM (DRAM) which requires power continually in order to refresh or maintain the data in the memory. Non-volatile memory typically includes a magnetic hard drive, a magnetic optical drive, or an optical drive (e.g., DVD RAM), or other type of memory system which maintains data even after power is removed from the system. The non-volatile memory may also include a random access memory. Further, the non-volatile memory may include a local device coupled directly to other components in the data processing system. A non-volatile memory that is remote from the system, such as a network storage device coupled to the data processing system through a network interface such as a modem or Ethernet interface, may also be used.

Memory 720 includes instructions for an operating system 703, which may include a network communication module 705. The operating system 703 may include procedures for handling various basic system services and for performing hardware dependent tasks. Examples of the operating system 703 include LINUX, UNIX, Windows, OS/390, OS/400, and the like.

Network communication module 705 is configured with a host/computer name and an internet protocol (IP) address and stores a media access control (MAC) address (721) of a network interface device. The network communication module 705 may include instructions used for connecting the system 700 to other computing devices via wired and/or wireless network/communication interface(s) 706 to networks such as the Internet, a WAN, a LAN, a MAN, or the like.

In one embodiment, memory 720 further includes instructions for application module 722. Application module 722 may include instructions for an email application (e.g. Gmail™), a document viewing application (e.g. Picasa™, Hello™, Blogger or a web browser), a document editing application (e.g. Picasa™ or Blogger), a document organizing application (e.g. Picasa™ or Blogger), an instant messaging application (e.g. Hello™), a web application, or the like.

Application module 722 may interact with user interface module 240 to output data on which an offering is based, a document having the data, and/or an offering. Application module 722 may to output device 220, electronic device 510 or peripheral device(s) 710 via I/O controller 708.

In one embodiment, memory 720 further includes instructions for user interface module 240. User interface module 240 may include instructions for displaying graphical user interfaces, including but not limited to toolbars (e.g. Google Toolbar). User interface module 240 may also include instructions to output content related to an electronic device (i.e. an offering) in the graphical user interface. For example, user interface module 240 may include instructions to embed in the graphical user interface a banner ad, an applet, Google AdSense™, or the like.

In one embodiment, memory 720 further includes instructions for data identification module 724. Data identification module 724 include instructions for identifying data provided by electronic device 510 or peripheral device(s) 710, or another device connected to system 700 via network/communication interface(s) 706, for example.

In one embodiment, memory 720 further includes instructions for storage module 210. Storage module 210 may include a database, a table, an array, or the like, to store and organize data provided by electronic device 510 or peripheral device(s) 710. Data identification module 724 may communicate with storage module 210 to retrieve data for identification.

In one embodiment, memory 720 further includes instructions for offering obtaining module 726. Offering obtaining module 726 include instructions for obtaining an offering, e.g. content related to electronic device 510 or peripheral device(s) 710, or another device connected to system 700 via network/communication interface(s) 706. Offering obtaining module 726 receives data from data identification module 724 to obtain content based on the data. Therefore, offering obtaining module 726 may communicate with network communication module 705 to access a database coupled to system 700 via network/communication interface(s) 706. In certain embodiments, offering obtaining module 726 may access storage module 210 to obtain content. In those embodiments, storage module 210 may include a database, a table, an array, or the like, to store and organize content.

CONCLUSION

In the above detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to obscure the present invention.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

Furthermore, the use of the phrase "one embodiment" throughout does not necessarily mean the same embodiment. Although these particular embodiments of the invention have been described, the invention should not be limited to these particular embodiments.

Reference to a "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Reference to a server as used herein may include a software application that carries out tasks on behalf of users such as file serving, application serving, web serving, mail serving, email serving, image server, and the like. The term server as used herein also includes any physical device on which such software is executed, such as a mainframe, a minicomputer, a personal computer, a dedicated server machine, and the like.

Reference to a client as used herein may include any system that accesses a service on another system by some kind of network. These clients include, but are not limited to, terminals, personal computers, thin clients, personal digital assistants (PDAs), mobile telephones, pagers, wireless handheld devices, game consoles and televisions.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, magnetic optical disks, read only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or writing the media in question. Specialty apparatus may include a collection of readily available pieces or an application specific integrated circuit (ASIC) including a series of logic blocks, for example.

The displays presented herein are not inherently related to any particular computer or other apparatus. Various general purpose systems may be used with programs in accordance with the teachings herein or it may be convenient to construct more specialized apparatus to perform the required method. For example, any of the methods according to the present invention can be implemented in hard wired circuitry by programming a general purpose processor or by any combination of hardware and software.

It will be appreciated that the invention can be practiced with systems such as stand-alone computers, hand held devices, multi-processor systems, microprocessor based or programmable consumer electronics, network personal computers, mainframe computers and the like.

The method of the invention may be implemented using computer software. If written in a programming language conforming to a recognized standard sequence of instructions, the methods can be compiled for execution on a variety of hardware platforms or machines and for interface to a variety of operating systems. In addition the present invention is not described with reference to any particular programming language. It will be appreciated that a variety of programming languages may be used to implement the teachings of the invention as described herein.

We claim:

1. A method comprising:
   receiving a media data file transferred from one of a plurality of electronic devices in response to a user request to view, edit, print, or transfer the media data file;
   extracting, with a processor, data from the received media data file captured by the one of the plurality of electronic devices;
   from the data extracted from the received media data file, identifying, with the processor, the one of the plurality of electronic devices from the plurality of electronic devices on which the media data file was captured;
   based on the data and a first tool selected by the user to process the media data file, obtaining, with the processor, content related to the particular electronic device; and
   in response to user selection of a second tool to process the media data file, obtaining, with the processor, new content related to the particular electronic device based on the data and the second tool.

2. The method of claim 1, wherein the content is an advertisement.

3. The method of claim 1, wherein the content comprises a link to a merchant site.

4. The method of claim 1, wherein the data includes metadata describing a software application used by the particular electronic device to process the media data file.

5. The method of claim 1, wherein the particular electronic device is a digital capture device, the media data file is presented to a user for viewing at a user computer system, and the media data file is received at a server computer system.

6. The method of claim 1, wherein the data is to include information relating to a model, brand, feature or accessory relating to the particular electronic device.

7. The method of claim 1, wherein obtaining the content is in response to viewing, editing, printing or transmitting a media data file containing the data.

8. The method of claim 7, wherein the media data file is a digital image, audio file, video file or audio/video file captured by the particular electronic device.

9. The method of claim 1, further comprising outputting the content on a web publishing site.

10. A non-transitory machine-readable medium having stored thereon a set of instructions, which when executed, cause a computing device to perform a method comprising:
    receiving data from an electronic device at an offering system extracted from a media data file captured by the electronic device, the data extracted from the media data file in response to a request from a user to view, edit, print or transmit the media data file;
    transmitting the data to a server to obtain advertisement information based on the data and a first tool selected by the user for processing the media data file and relevant to the captured media data file;
    providing the advertisement information to a user from the offering system; and
    transmitting the data to the server to obtain new advertisement information for providing to a user based on the data and a second tool selected by the user for processing the media data file.

11. The machine-readable medium of claim 10, wherein the data is to include a time, date, month, year, season or time period relating to the capture of the media data file by the electronic device.

12. The machine-readable medium of claim 10, wherein the data is to relate to creation, modification, viewing, storing or receiving of the media data file captured by the electronic device.

13. The machine-readable medium of claim 10, wherein providing the information comprises providing a location of where an advertisement is stored.

14. The machine-readable medium of claim 10, wherein the method further comprises:
    obtaining a plurality of advertisements based on the advertisement information;
    selecting an advertisement from the plurality;
    formatting the selected advertisement for display in a user interface; and
    outputting the formatted advertisement via the user interface.

15. The machine-readable medium of claim 14, wherein the user interface is part of a photo album web publishing site.

16. A system having a memory storing one or more images captured by digital cameras and a processor coupled with the memory the processor performing operations comprising:
    receiving an image captured by a digital camera in response to a request from a user to view, edit, print or transmit the image;
    analyzing data related to and extracted from the image;
    providing an advertisement relevant to the image based on the data and a first tool selected by the user for processing the media data file; and
    providing a new advertisement relevant to the image based on the data and a second tool selected by the user for processing the media data file.

17. The system of claim 16, wherein the data is to include a description of the image, a filename, an album name, a file system folder name, a network address or a description of a tool used to create or modify the image.

18. The system of claim 16, wherein the processor to provide the advertisement includes the processor to provide the advertisement from a web publishing site.

19. The system of claim 16, wherein the processor to provide the advertisement includes the processor to provide the advertisement in an email application, a document viewing application, a document editing application or a document organizing application.

20. The system of claim 16, wherein the processor to provide the advertisement includes the processor to provide the advertisement via a toolbar, a button, a menu, a banner or a pop-up window.

21. The system of claim 16, wherein the processor to analyze the data includes the processor to perform image recognition to analyze image content of the captured image and provide the advertisement relevant to the image content.

22. The method of claim 1, wherein the first tool is an image viewing tool to display the media data file to a user, and the second tool is a printing tool to print the media data file.

23. The method of claim 1, wherein the first tool is an image viewing tool to display the media data file to a user, and the second tool is a data transfer tool to transmit the media data file.

24. The method of claim 1, wherein the first tool is a printing tool to print the media data file, and the second tool is a data transfer tool to transmit the media data file.

* * * * *